US009222785B2

(12) United States Patent
Banin et al.

(10) Patent No.: US 9,222,785 B2
(45) Date of Patent: Dec. 29, 2015

(54) SYSTEMS AND METHODS OF REDUCING TIMING MEASUREMENT ERROR DUE TO CLOCK OFFSET

(71) Applicant: Intel Corporation, Santa Clara, CA (US)

(72) Inventors: Leor Banin, Petach Tikva (IL); Yuval Amizur, Kfar-Saba (IL); Uri Schatzberg, kiryat ono (IL); Adrian P Stephens, Cottenham (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/926,314

(22) Filed: Jun. 25, 2013

(65) Prior Publication Data

US 2014/0136093 A1    May 15, 2014

Related U.S. Application Data

(60) Provisional application No. 61/724,358, filed on Nov. 9, 2012.

(51) Int. Cl.
| | |
|---|---|
| *G05D 1/02* | (2006.01) |
| *G06F 17/10* | (2006.01) |
| *G06G 7/78* | (2006.01) |
| *G01C 21/20* | (2006.01) |
| *G01S 5/02* | (2010.01) |
| *G01S 5/14* | (2006.01) |

(52) U.S. Cl.
CPC .............. *G01C 21/206* (2013.01); *G01S 5/021* (2013.01); *G01S 5/14* (2013.01)

(58) Field of Classification Search
CPC ........ G01S 5/00; H04W 64/00; H04W 64/03; G01C 21/206
See application file for complete search history.

(56) References Cited

U.S. PATENT DOCUMENTS

| | | | | |
|---|---|---|---|---|
| 5,515,062 | A * | 5/1996 | Maine et al. ................... | 342/457 |
| 6,522,696 | B1 * | 2/2003 | Mobin et al. ................... | 375/262 |
| 6,618,452 | B1 * | 9/2003 | Huber et al. ................... | 375/343 |
| 7,054,126 | B2 * | 5/2006 | Strutt et al. .................... | 361/119 |

(Continued)

OTHER PUBLICATIONS http://ieeexplore.ieee.org/stamp/stamp.jsp?tp=&arnumber=4784467&tag=1 "TOA-based distributed localisation with unknown internal delays and clock frequency offsets in wireless sensor networks" K. Yu, Y.J. Guo, and M. Hedley IET Signal Process., 2009, vol. 3, Iss. 2, pp. 106-118.*

*Primary Examiner* — John R Olszewski
*Assistant Examiner* — Tommy Worden
(74) *Attorney, Agent, or Firm* — Schwegman Lundberg & Woessner, P.A.

(57) ABSTRACT

Navigation systems for use in indoor environments may include a navigation system that can calculate a time of flight of signals between a navigation device and a WiFi® Access Point. Such a calculation can be more accurate not just by using more accurate oscillators in devices, but by correcting a relative error between two devices. This relative error may be found by determining a timing offset correction, a difference in accuracy between the navigation device and the WiFi® Access Point. This may be performed by performing a fine frequency estimation on a long training field or by receiving a parts per million (ppm) offset from another device. Once the ppm offset is determined, the accuracy of the navigation device can be improved by a factor of 50 using a series of equations described in the disclosure.

14 Claims, 4 Drawing Sheets

(56) References Cited

U.S. PATENT DOCUMENTS

| | | | |
|---|---|---|---|
| 2002/0039396 A1* | 4/2002 | Zalio | 375/355 |
| 2002/0044614 A1* | 4/2002 | Molnar et al. | 375/346 |
| 2005/0068886 A1* | 3/2005 | Wang et al. | 370/210 |
| 2005/0226414 A1* | 10/2005 | Lee et al. | 380/210 |
| 2006/0146962 A1* | 7/2006 | Troya et al. | 375/340 |
| 2006/0153313 A1* | 7/2006 | Lee et al. | 375/285 |
| 2007/0074242 A1* | 3/2007 | Wang et al. | 725/31 |
| 2007/0155401 A1* | 7/2007 | Ward et al. | 455/456.1 |
| 2007/0206638 A1* | 9/2007 | Santoru et al. | 370/476 |
| 2008/0025151 A1* | 1/2008 | Urano et al. | 368/14 |
| 2008/0181291 A1* | 7/2008 | Zhou et al. | 375/227 |
| 2009/0046593 A1* | 2/2009 | Ptasinski et al. | 370/252 |
| 2009/0251364 A1* | 10/2009 | Lorenz | 342/357.02 |
| 2009/0257426 A1* | 10/2009 | Hart et al. | 370/350 |
| 2009/0296681 A1* | 12/2009 | Tasa et al. | 370/345 |
| 2009/0315769 A1* | 12/2009 | Whelan et al. | 342/357.09 |
| 2010/0020909 A1* | 1/2010 | Jung et al. | 375/371 |
| 2010/0190509 A1* | 7/2010 | Davis | 455/456.1 |
| 2010/0246544 A1* | 9/2010 | Brisebois et al. | 370/338 |
| 2010/0265970 A1* | 10/2010 | Toscano | 370/522 |
| 2011/0205964 A1* | 8/2011 | Fix et al. | 370/328 |
| 2011/0207470 A1* | 8/2011 | Meredith et al. | 455/456.1 |
| 2012/0081248 A1* | 4/2012 | Kennedy et al. | 342/118 |
| 2012/0165012 A1* | 6/2012 | Fischer et al. | 455/435.1 |
| 2012/0177027 A1* | 7/2012 | Venkatraman et al. | 370/350 |
| 2012/0207183 A1* | 8/2012 | Bobrek et al. | 370/511 |

* cited by examiner

SYSTEMS AND METHODS OF REDUCING TIMING MEASUREMENT ERROR DUE TO CLOCK OFFSET

CROSS-REFERENCE TO RELATED APPLICATIONS

This application claims priority under 35 U.S.C. §119 to U.S. Provisional Patent Application Ser. No. 61/724,358, filed Nov. 9, 2012, incorporated herein by reference in its entirety.

TECHNICAL FIELD

Embodiments pertain to electronics. Some embodiments pertain to electronic navigation products.

BACKGROUND ART

Electronic navigation products for use in the outdoors are becoming increasingly common. Typically, such products use Global Navigation Satellite Systems (GNSS) such as Global Positioning System (GPS) and GLONASS, which require the ability to read signals from orbiting satellites. However, such signals may not be readable from indoor locations. Thus, GNSS systems typically do not work well for navigation in indoor environments, such as tunnels, shopping malls, parking garages, and the like.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DESCRIPTION OF THE EMBODIMENTS

Figure 1:
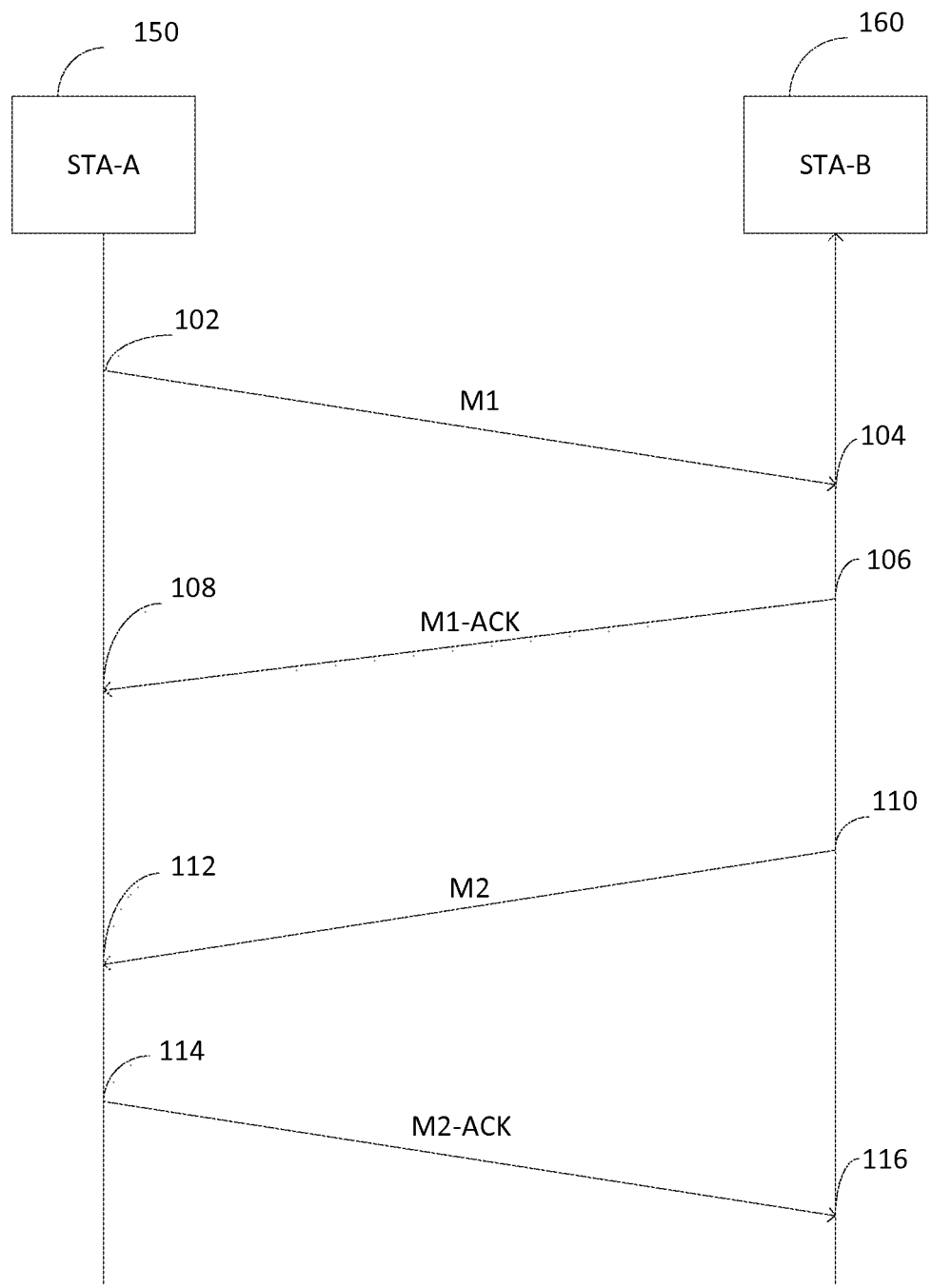
FIG. 1 is a timing diagram illustrating the transmission of signals between two devices.

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

In the following detailed description, numerous specific details are set forth in order to provide a thorough understanding of the invention. However, it will be understood by those skilled in the art that the present invention may be practiced without these specific details. In other instances, well-known method, procedures, components, and circuits have not been described in detail so as not to obscure the present invention.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of devices" may include two or more devices.

Navigation devices for use outdoors typically measure the time needed for a signal to travel from the device to a satellite that is orbiting the Earth. When multiple satellites are being accessed, the time needed for the signals to travel to and from the navigation device to each satellite is used in a process called trilateration—the known location of the satellites and the time of flight of the signals is used to calculate the location of the navigation device.

A problem occurs in indoor locations in that buildings may prevent a navigation device from sending and receiving signals from a satellite. Thus, handheld devices used by a person walking indoors may not provide accurate locations. This problem may also occur in automotive navigation, when the device lacks access to satellite signals, e.g., within a tunnel, a parking garage, or in a street surrounded by tall buildings.

One method of indoor navigation measures the Time of Flight of a signal traveling from a navigation device to a WiFi Access Point (AP) and back. The time can be converted into distance by dividing the time by two and multiplying it by the speed of light (299,792,458 meters per second). Because the distances in indoor environments are relatively small and the speed of light is so fast, the time being measured is very small. For example, a signal travels approximately 1 meter in 3.3 nanoseconds. In contrast, the distances involved in outdoor navigation is from the surface of the Earth to a satellite orbiting at approximately 20 kilometers (12.4 miles). The time for a signal to traverse those distances is approximately 66 microseconds. An accurate clock is desired.

For an indoor system, each system providing navigation (e.g., the AP and a user's navigation device) has a crystal responsible for generating all the clocks in the system. The accuracy of these types of clocks may be on the order of 10 to 50 parts per million (ppm), especially in low-cost devices, where less expensive and less reliable oscillators may be in use. Ten ppm corresponds to nearly one second per day and fifty ppm corresponds to over four seconds per day, approximately $10^6$ or more times less accurate than an atomic clock, such as those present in GPS satellites.

FIG. 1 presents a timing diagram of how Time of Flight may be measured in an indoor environment. FIG. 1 illustrates the signals being transmitted between Device A ("STA-A") 150 and Device B ("STA-B") 160. In this particular example, STA-A 150 is a navigation device and STA-B 160 is a WiFi access point. However, it should be understood that both STA-A 150 and STA-B 160 do not need to be specifically a navigation device and a WiFi access point. Instead, STA-A 150 and STA-B 160 may be a variety of different devices.

A navigation device may be any electronic device that is capable of providing navigation information. Exemplary navigation devices include standalone navigation devices, smart phones with navigation features, tablets, laptop computers, desktop computers, televisions, household appliances, other electronic devices with the capability to transmit and receive signals, and the like. STA-B may be any type of device that STA-A may communicate with, including wireless access points, wireless routers, network bridges, range extenders, repeaters, other navigation devices, and the like.

At 102, STA-A 150 sends action frame M1. The time, $t_1$, of this action frame is ToD(M1), where ToD stands for Time of Departure. At 104, STA-B 160 receives the action frame M1 at time $t_2$. This can be designated as Time of Arrival (ToA (M1)). STA-B 160 then sends an acknowledgement signal (M1-ACK) to STA-A 150 (106). The time of this action, $t_3$, is ToD (M1-ACK). STA-A 150 receives the acknowledgement, M1-ACK at time $t_4$ (108). The time of this message, $t_4$, is denoted as ToA (M1-ACK).

It should be understood that, in FIG. 1, time flows from the top of FIG. 1 to the bottom of FIG. 1. For example, 102 occurs before 104, which happens before 106 and so on.

STA-A 150 and STA-B 160 both keep inaccurate time due to inaccuracies in the oscillators in STA-A 150 and STA-B 160. But the errors of each of the devices may be different. Thus, the inaccuracies of $t_1$ and $t_4$ are different from the inaccuracies of $t_2$ and $t_3$.

With continuing reference to FIG. 1, at 110, STA-B 160 sends action frame M2 to STA-A 150. Action frame M2 contains ToA timestamp $t_2$ and ToD timestamp $t_3$. In the alternative, action frame M2 may only contain the difference between ToD timestamp $t_3$ and ToA timestamp $t_2$. At 112, STA-A 150 receives action frame M2. At 114, STA-A 150 sends action frame M2-ACK to STA-B 160. STA-B 160 receives action frame M2 at 116.

The time the signal is being actually transmitted can be calculated in the following manner. Using the $t_2$ and $t_3$ times contained in action frame M2 and the $t_1$ and $t_4$ times that it determined, STA-A 150 can calculate the Time of Flight (ToF) between STA-A and STA-B using the formula:

$$ToF = [(t_4 - t_1) - (t_3 - t_2)]/2$$

STA-A can then calculate the distance between STA-A 150 and STA-B 160 using the formula:

R=ToF*c, where c=the speed of light and R is the calculated distance between STA-A 150 and STA-B 160.

If there are multiple APs within WiFi distance of STA-A 150, then STA-A 150 can calculate the distance between STA-A 150 and each AP. Each of these distances can then be used with a trilateration formula and the known locations of each AP to determine the location of STA-A. In general, at least three known locations would be needed to perform a trilateration calculation to determine the exact location of STA-A 150.

The times $t_1$, $t_2$, $t_3$, and $t_4$ are the times as measured by the respective devices ($t_1$ and $t_4$ as measured by STA-A 150 and $t_2$ and $t_3$ as measured by STA-B 160). One can notate the real times (as measured by an accurate third-party clock) as $t_{1r}$, $t_{2r}$, $t_{3r}$, and $t_{4r}$. Thus, the real Time of Flight may be calculated as follows:

$$ToF = [(t_{4r} - t_{1r}) - (t_{3r} - t_{2r})]/2$$

It should also be noted that $t_{2r}$ and $t_{4r}$ can be calculated in terms of ToF as follows:

$$t_{2r} = t_{1r} + ToF; \text{ and}$$

$$t_{4r} = t_{3r} + ToF$$

More calculations can be performed on these times. Let "a" be the scaling factor of STA-A 150. The scaling factor is equal to (1+the error (in ppm)/1,000,000). Similarly, let "b" be the scaling factor of STA-B 160. Let "x" be the constant offset of the clock of STA-A 150 (i.e., the difference between the real time and the time as indicated by STA-A 150). Let "y" be the constant offset of the clock of STA-B 160. The above times, as determined by STA-A 150 and STA-B 160, can be stated in terms of the real clock as follows:

$$t_1 = a*t_{1r} + x; \; t_1 \text{ in } STA\text{-}A \text{ clock}$$

$$t_4 = a*t_{4r} + x; \; t_4 \text{ in } STA\text{-}A \text{ clock}$$

$$t_2 = b*t_{2r} + y; \; t_2 \text{ in } STA\text{-}B \text{ clock}$$

$$t_3 = b*t_{3r} + y; \; t_3 \text{ in } STA\text{-}B \text{ clock}$$

Substituting these values, the total round trip time as seen by the clock in STA-A 150 can be calculated as follows:

$$t_4 - t_1 = a*t_{4r} + x - (a*t_{1r} + x) = a*(t_{4r} - t_{1r}) = a*(t_{3r} + ToF - t_{1r})$$

The total processing time as seen by the clock in STA-B 160 may be calculated as follows:

$$t_3 - t_2 = b*t_{3r} + y - (b*t_{2r} + d) = b*(t_{3r} - t_{2r}) = b*(t_{3r} - t_{1r} - ToF)$$

One can calculate the estimated Time of Flight ($ToF_{estimated}$) in the following manner:

$$ToF_{estimated} = [(a*(t_{3r} + ToF - t_{1r}) - b*(t_{3r} - t_{1r} - ToF)]/2$$

This equation can be further simplified as follows:

$$ToF_{estimated} = (0.5*(a+b)*ToF) + (0.5*(a-b)*(t_{3r} - t_{1r})) \quad [EQ 1]$$

In an exemplary situation, $t_{3r} - t_{1r}$ is around 100 microseconds, while a and b are approximately 50 ppm. In this situation, the scaling of the ToF is 50 ppm is approximately 0.005%, which is a small error that can be ignored. However, the second term of the equation adds to the range error as follows, where c is the speed of light:

$$100 \; \mu s * 50 \; ppm * c = 1.5 \; m$$

While an error of 1.5 m may be adequate for some uses, it would be better if the error were lessened.

If, instead of using the error of both STA-A 150 and STA-B 160, STA-B 160 instead estimates its carrier frequency offset or "ppm offset" relative to STA-A 150, this ppm offset may be used to correct the calculations for better performance. For timing measurements, the ppm offset can be used to correct the ToA and ToD.

To better understand ppm offset, imagine that a hypothetical channel is defined to use the frequency of 2.403 GHz (2,403,000,000 Hz). A station on one side (e.g., STA-A 150) may have a frequency error of +20 ppm, which corresponds to: (20/1e6)*2.403 GHz=2,403,048,060 Hz. The terminal it is communicating with (e.g., STA-B 160), may have a frequency error of −30 ppm, which, using the same formula, corresponds to 2,402,927,910 Hz.

The relative ppm offset between STA-A 150 and STA-B 160 can be denoted as $p_{est}$ and may be calculated as follows:

$$p_{est} = b/(a+\epsilon)$$

In the above formula, $\epsilon$ is the residual error caused by imperfect estimation of the clocks. In typical cases, E is very small—typically less than 1. In contrast the residue error of b is on the order of 50 times greater.

Thereafter, $t_2$ and $t_3$ can be calculated as follows:

$$t_2 = b*t_{2r} y \rightarrow t_{2corrected} = t_2/p_{est} = t_{2r}*(a+\epsilon) + d'$$

$$t_3 = b*t_{3r} y \rightarrow t_{3corrected} = t_3/p_{est} = t_{3r}*(a+\epsilon) + d'$$

Then estimated ToF can be calculated as follows:

$$ToF_{Estimated} = 0.5 * [(t_4 - t_1) - (t_{3corrected} - t_{2corrected})] == \quad [EQ 2]$$
$$0.5 * [a*(t_{3r} + ToF - t_{1r}) -$$
$$(t_{3r}*(a+\varepsilon) - (t_{1r} + ToF)*(a+\varepsilon))] ==$$
$$0.5 * [(a + a + \varepsilon)*ToF + (a - a - \varepsilon) *$$
$$(t_{3r} - t_{1r})] = \sim = \sim a*ToF - (0.5*\varepsilon*(t_{3r} - t_{1r}))$$

In comparison to the formula posted above as EQ 1, the scaling factor (the first term) is approximately the same: In EQ 1, the scaling factor is 0.5*(a+b)*ToF; in EQ2, the scaling factor is a*ToF. As long as a and b are of similar magnitude, the scaling factor of the two equations is similar. However, the second argument is much smaller by using $\epsilon$ instead of a−b. In comparison to the formula presented above, if the ppm offset estimation error $\epsilon$ is 1 ppm, the range error is 50 times less, or approximately 3 centimeters instead of 1.5 meters.

The above series of equations discuss the situation in which the M2 action frame contains $t_2$ and $t_3$, so that STA-A 150 has access to those times in the time base of STA-B 160. In the alternative, the M2 message can be sent from STA-A 150 to STA-B 160, so that STA-B 160 has access to those times in the time base of STA-B 160.

These equations also show that the offset of STA-A 150 or STA-B 160 from the true clock has a only a small effect on the time of flight measurement, the ppm offset between the devices is a much more relevant to these calculations.

There may be several different methods of implementing the above series of equations into various pieces of equipment. In one embodiment, the ppm offset estimation can be sent from a STA-B 160 to a STA-A 150. Thereafter, when STA-A 150 makes calculations for $ToF_{Estimated}$, it uses the ppm offset information provided by the STA-B 160. Such an embodiment would normally have STA-B 160 send the ppm offset estimation data to STA-A 150 as part of the handshaking procedure. Of course, it should be understood that the roles of STA-B 160 and STA-A 150 may be reversed such that STA-A 150 is sending ppm offset information data to STA-B 160.

In another embodiment, the ppm offset error can be estimated. This can be performed by a WiFi® access point, such as STA-A 150, by one of a variety of techniques. In the alternative, such an estimation can be performed by STA-B 160, by using similar techniques.

In another embodiment, the ppm offset error can be estimated in a different manner. For example, a modem that is coupled to the WiFi® access point may estimate the ppm offset error. This may be performed in a number of different ways.

Returning to the example above, where an ideal signal would be 2,403,000,000 Hz, but STA-A is actually at 2,403,048,060 Hz and STA-B is at 2,402,927,910 Hz. STA-B can calculate the ppm offset by subtracting the two frequencies and dividing by the frequency of STA-B (2,402,927,910−2,403,048,060)/2,402,927,910=50 ppm.

This ppm offset is typically not transmitted, but it may be calculated from reference/training symbols. Many forms of WiFi® transmits data in frames, which may be separated into different fields. The header frame in some forms of WiFi® may contain Short Training Fields, Long Training Fields or variations thereof, such as the Legacy Short Training Field (L-STF), Legacy Long Training Field (L-LTF), High Throughput Short Training Field (HT-STF) and the High Throughput Long Training Field (HT-LTF). One or more of these long training fields may be used to determine the ppm offset error.

Both the L-STF and the L-LTF may comprise a duplicated training symbol that may be used for channel estimation. The L-STF is a short training preamble of a 0.8 microsecond duration that is repeated ten times. The L-LTF is a long training symbol that is repeated twice. The contents of the training symbols are defined in the various 802.11 specifications, such as Institute of Electrical and Electronic Engineers (IEEE) standard 802.11n-2009, published 29 Oct. 2009, section 20.3.9.3.3.

The L-STF and L-LTF may be used to calculate the ppm offset. The frequency mismatch of the carrier frequency translates to a frequency shift in the baseband. A frequency mismatch of up to 312.5 kHz (the carrier spacing) may be detected comparing the parts of the training symbols that were transmitted twice. The two parts at the receiver side have an average phase offset relative to the frequency offset (in this case, 120/312.5*2*pi).

There may be several steps in calculating the phase difference. This may be performed in one of several different manners. For example, first, a coarse estimation of the phase difference is calculated. This may be performed by using the L-STF. More specifically, at the transmitter side, the short training field symbol is modulated with the transmitter side carrier frequency. At the receiver side, the signal is demodulated with a slightly different carrier frequency. After demodulating at the receiver, the symbol has from a frequency offset:

$$s'[n] = s[n] * e^{-2\pi i \frac{\Delta f}{f_s} n},$$

where $\Delta f$ is the frequency offset and $f_s$ is the sampling frequency.

The phase offset, $\phi$, is equal to:

$$\varphi = \text{angle}\left(\sum_{n=1}^{N} \frac{s'[n]}{s'[n+N]}\right), \text{ where angle } (c) = \arctan\frac{imag[c]}{real[c]}$$

Then, the ppm offset can be derived:

$$ppm \text{ offset} = \frac{\varphi}{2\pi} * \frac{f_s/N}{\text{Carrier frequency}}$$

Thereafter, a fine estimation of the phase difference is calculated. This may be performed in a similar manner, using the L-LTF instead of the L-STF.

In another embodiment, the ToD and ToA values can be corrected on one side, using either the time base of STA-A 150 or the time base of STA-B 160. If the time base of STA-B 160 is used, STA-B 160 does not correct its measurements prior to sending $t_2$ and $t_3$ to STA-A 150 in the M2 message. Instead, STA-A calculates corrected times for $t_2$ and $t_3$ using the ppm offset estimation information.

In another embodiment, the time base of STA-A 150 is used. In such a case, STA-B 160 estimates its ppm offset from STA-A 150 and corrects the measurements prior to sending $t_2$ and $t_3$ in the M2 message. In other words, instead of sending $t_2$ and $t_3$, STA-B sends $t_{2,corrected}$ and $t_{3,corrected}$ to STA-A. Thereafter, STA-A can calculate time of flight using the corrected timings.

While some of the devices have been discussed in terms of access points, as stated above, STA-B may be any type of device that STA-A may communicate with, including wireless access points, wireless routers, network bridges, range extenders, repeaters, other navigation devices, and the like. Each such device includes a processor arranged to perform calculations and a transceiver arranged to send and receive signals using an antenna assembly.

Figure 2:
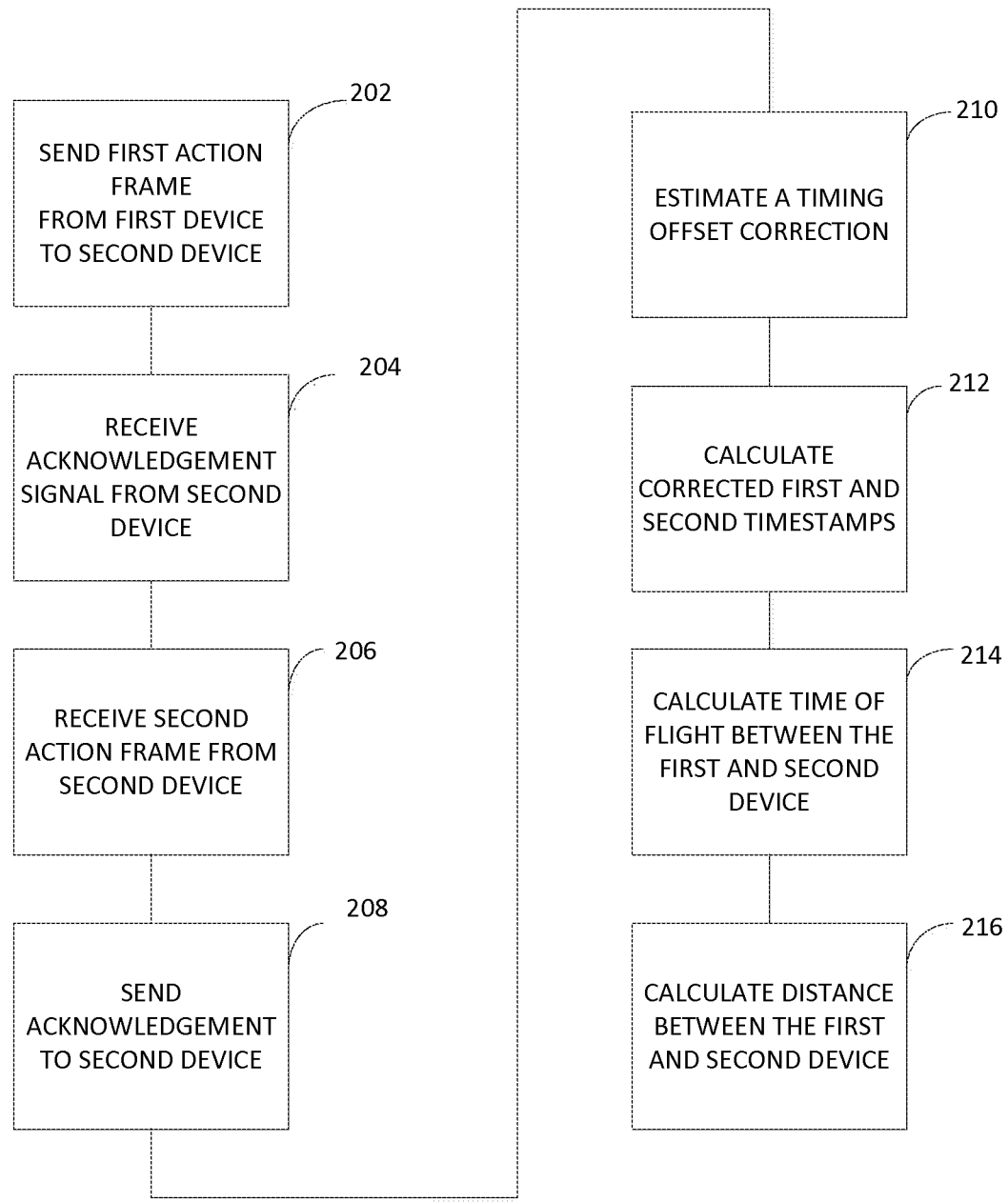
FIG. 2 is a flowchart illustrating the operation of an embodiment.

FIG. 2 is a flowchart illustrating the operation of an embodiment. As described above, a first device (such as STA-A 150) sends a first action frame to a second device (such as STA-A 160) (202). Thereafter, the second device receives the action frame and sends an acknowledgement signal, which is received by the first device (204). Thereafter the second device sends a second action frame, which is received by the first device (206). The second action frame contains a first timestamp and a second timestamp. The first timestamp indicates the time at which the second device received the first action frame. The second timestamp indicates the time at which the second device sent the second action frame. In the alternative, the second action frame may contain the difference between the first timestamp and the second timestamp. The first device sends an acknowledgement signal to the first device (208). A timing offset correction or ppm offset between the first device and the second device is estimated (210). Thereafter, a corrected first timestamp and a corrected second timestamp are calculated (212). The corrected first timestamp and a corrected second timestamp are based on the first timestamp and second timestamp that were contained in the second action frame, corrected using the timing offset correction as described above. The time of flight between the first and second device is then calculated as described above (214). Then the distance between the first and second device can be calculated by using the speed of light and the time of flight (216).

Figure 3:
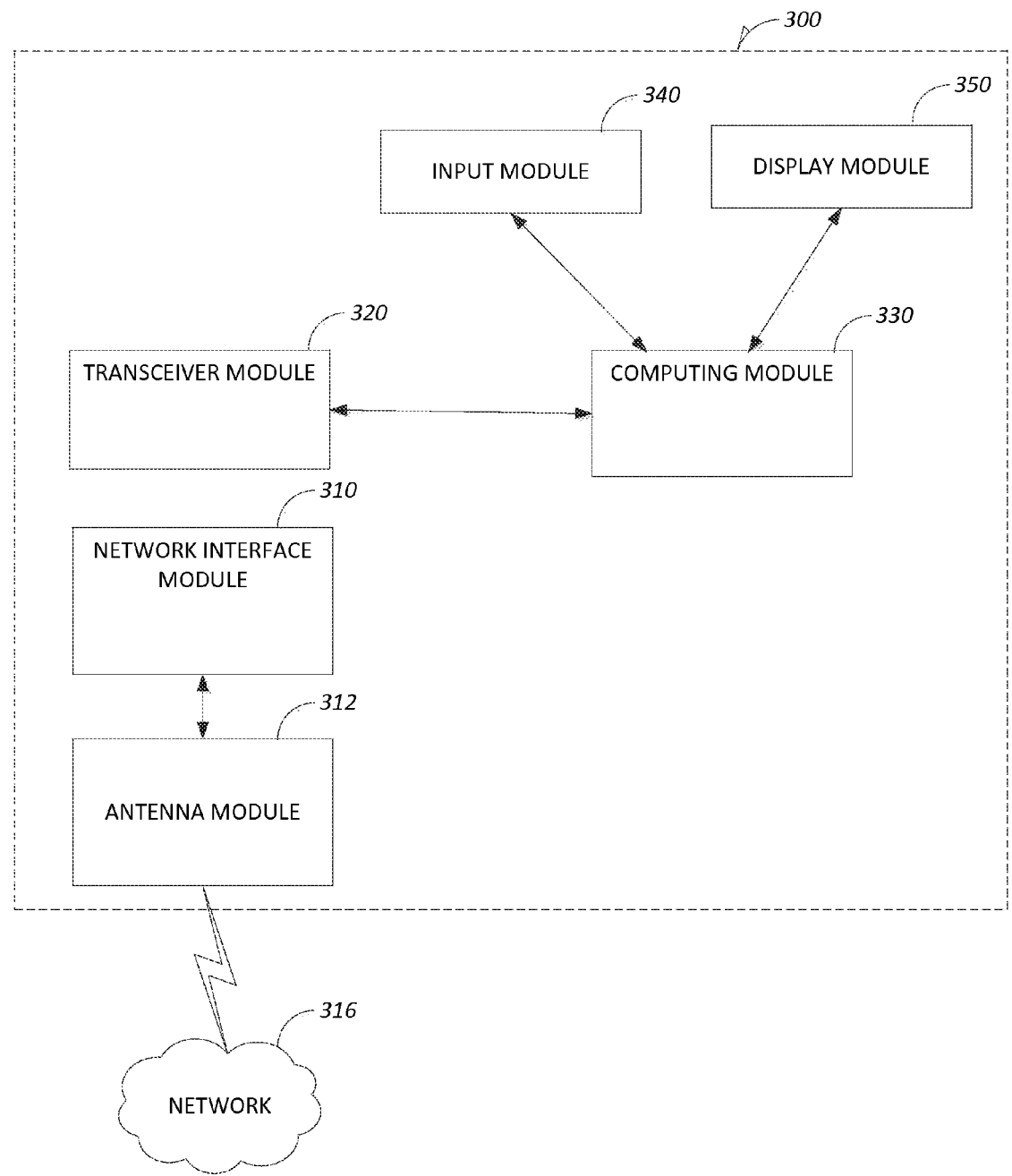
FIG. 3 is a block diagram illustrating an exemplary device capable of operating an embodiment.

FIG. 3 is a block diagram illustrating an exemplary device upon which any one or more of the techniques (e.g., methodologies) discussed herein may perform. A device 300 may comprise a network interface module 310, a transceiver module 320 coupled to network interface module 310, and a computing module 330 coupled to transceiver module 320. Network interface module 310 may comprise devices arranged to transmit and receive signals to a network 316 via an antenna module 312. Antenna module 312 may contain one or more antennas arranged to transmit and receive signals at specific frequencies. Transceiver module 320 may be configured to process signals received by network interface module 310. Computing module 330 may comprise one or more processors configured to execute instructions that cause various computations to occur. Device 300 may interact with the user through a variety of different modules, including an input module 340, and a display module 350. Input module 340 is arranged to accept inputs from a user. Common types of inputs that could be used in input module 340 include keyboards, buttons, touchpads, joysticks, switches, and the like. Display module 350 is arranged to display data to a user. The functions of input module 340 and display module 350 may be combined in one device, such as a touchscreen display.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Figure 4:
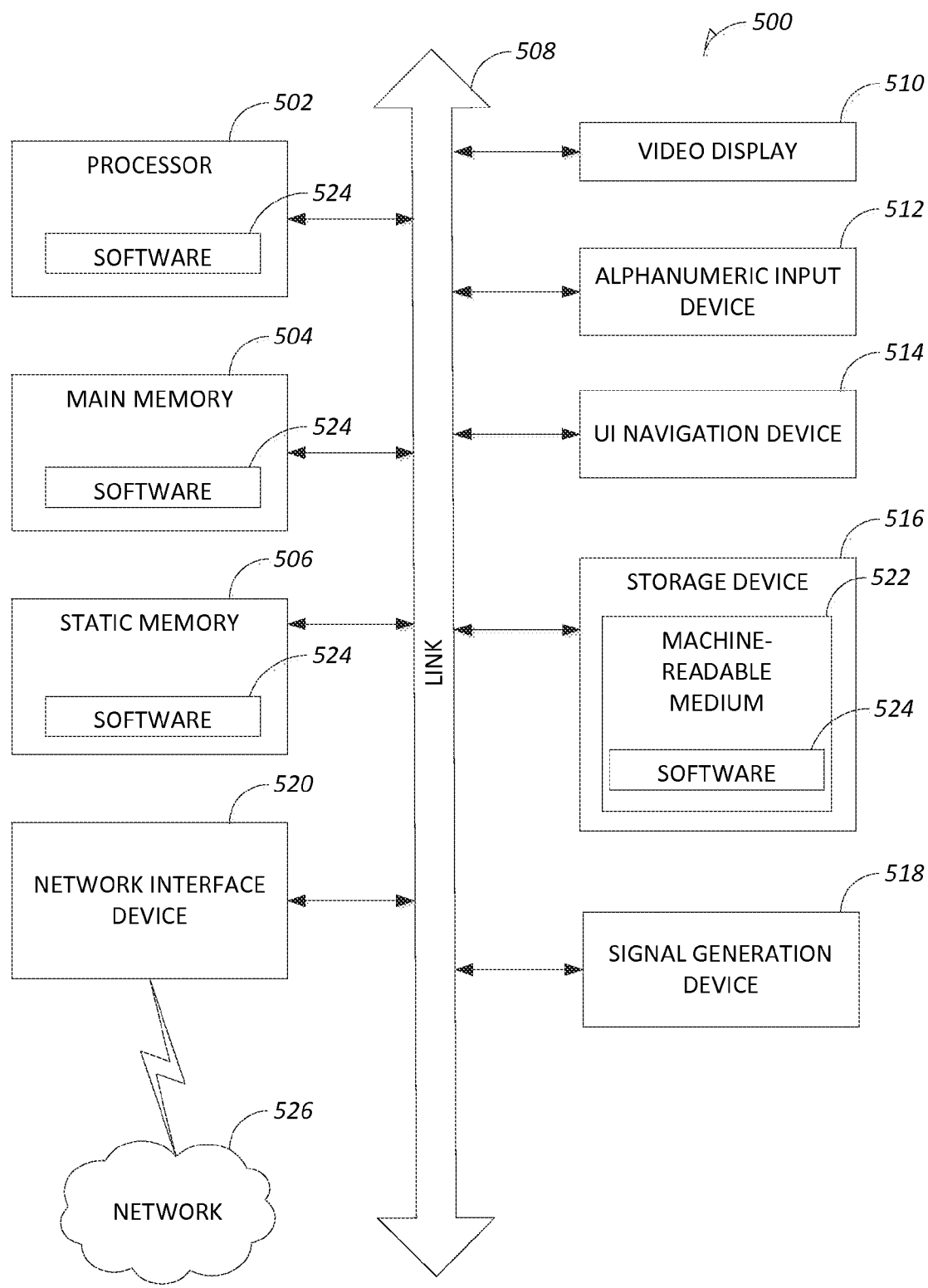
FIG. 4 is a block diagram illustrating an exemplary machine capable of operating an embodiment.

FIG. 4 is a block diagram illustrating an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a smartphone, a web appliance, a network router, switch or bridge, a dedicated navigation device, laptop computers, a television, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse or track pad). In an example, the display device 510, input device 512 and UI navigation device 514 may be a touch screen display that accomplishes all three tasks. The machine 500 may additionally include a mass storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage device 526 may include a non-transitory machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine-readable media.

While the machine-readable medium 522 is illustrated as a single medium, the term "machine-readable medium" may include a single medium or multiple media (e.g., a centralized or distributed database, and/or associated caches and servers) that is arranged to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having resting mass. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM, DVD-ROM, and Blu-Ray disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

The following examples pertain to further embodiments.

Example 1 is A method for calculating a distance between a first electronic device and a second electronic device comprising: estimating a timing offset correction between the first electronic device and the second electronic device; calculating a corrected first timestamp and a corrected second timestamp using the timing offset correction and calculating a time of flight using the corrected first timestamp and the corrected second timestamp; calculating the distance between the first electronic device and the second electronic device using the time of flight; wherein estimating a timing offset correction comprises: comparing a short training frame from the first electronic device with a short training frame from the second electronic device to estimate the timing offset correction.

In example 2, the subject matter of example 1 may optionally include estimating a timing offset correction further comprises: comparing a long training frame from the first electronic device with a long training frame from the second electronic device to refine the timing offset correction; and further wherein, comparing a short training frame from the first electronic device with a short training frame from the second electronic device comprises calculating a phase offset between the short training frame from the first electronic device with the short training frame from the second electronic device; and determining the timing offset correction from the phase offset.

In example 3, the subject matter of example 1 may optionally include: sending a first action frame from the first electronic device to the second electronic device and receiving a first acknowledgement signal from the second electronic device that acknowledges that the second electronic device received the first action frame; receiving a second action frame from the second electronic device, the second action frame including a first timestamp indicating the time at which the second electronic device received the first action frame and a second timestamp indicating the time at which the second electronic device sent the second action frame; and wherein, calculating the first corrected timestamp comprises combining the first timestamp and the timing offset correction; and calculating the second corrected timestamp comprises combining the first timestamp and the timing offset correction.

In example 4, the subject matter of example 1 may optionally include: wherein estimating a timing offset correction, calculating a corrected first timestamp and a corrected second timestamp, calculating the time of flight, and calculating the distance are performed by the first electronic device.

In example 5, the subject matter of example 1 may optionally include estimating a timing offset correction between the first electronic device and the second electronic device is performed by the second electronic device; calculating a corrected first timestamp and a corrected second timestamp using the timing offset correction is performed by the second electronic device; and the second action frame includes the corrected first timestamp and the corrected second timestamp.

In example 6, the subject matter of example 1 may optionally include wherein estimating a timing offset correction between the first electronic device and the second electronic device is performed by a third electronic device; and wherein the method further comprises: receiving the timing offset correction from the third electronic device.

In example 7, the subject matter of example 1 may optionally include calculating a corrected first timestamp comprises dividing the first timestamp by the timing offset correction; and calculating a corrected second timestamp comprises dividing the second timestamp by the timing offset correction.

In example 8, the subject matter of example 1 may optionally include wherein the first action frame is a first WiFi action frame; and the second action frame is a second WiFi action frame.

In example 9, the subject matter of example 1 may optionally include wherein the timing offset correction comprises the relative timing offset between the first electronic device and the second electronic device.

Example 10 is an apparatus arranged to calculate the distance between the apparatus and an external device, the apparatus comprising: a network interface module; a computing module arranged to: estimate a timing offset correction between the apparatus and the external device by comparing a short training frame from the second electronic device with a generated short training frame; calculate a corrected first timestamp and a corrected second timestamp using the timing offset correction; calculate the time of flight between the system and the external device using the corrected first timestamp and the corrected second timestamp; and calculate the distance between the system and the external device using the time of flight.

In example 11, the subject matter of example 10 may optionally include a transceiver module arranged to: send a first action frame to the external device via the network interface module; receive an first acknowledgement signal from the external device via the network interface module which acknowledges that the external device received the first action frame; receive a second action frame from the second electronic device via the network interface module, the second action frame including a first timestamp indicating the time at which the external device received the first action frame and a second timestamp indicating the time at which the external device sent the second action frame; and send a second acknowledgement signal to the external device via the network interface module; and wherein, the computing module is arranged to calculate the first corrected timestamp using the first timestamp and to calculate the second corrected timestamp using the second timestamp.

In example 11, the subject matter of example 10 may optionally include the computing module being further arranged to calculate a corrected first timestamp by dividing the first timestamp by the timing offset correction; and to calculate a corrected second timestamp by dividing the second timestamp by the timing offset correction.

In example 12, the subject matter of example 10 may optionally include the computing module is further arranged to refine an estimate of the timing offset correction by comparing a long training frame from the second electronic device with a generated long training frame.

In example 13, the subject matter of example 10 may optionally include wherein the computing module is further arranged to refine an estimate of the timing offset correction by comparing a long training frame from the second electronic device with a generated long training frame.

In example 14, the subject matter of example 10 may optionally include wherein the system is a portable electronic device further comprising: an input module; and a display module.

In example 15, the subject matter of example 13 may optionally include wherein the portable electronic device is arranged to send and receive WiFi signals via the network interface module.

In example 16, the subject matter of example 10 may further comprise the system being a WiFi access point.

Example 17 is a machine-readable medium that stores instructions which, when executed by a machine device, causes the machine to perform operations comprising: estimating a timing offset correction between the machine and the external device by comparing a short training frame from the second electronic device with a generated short training frame; calculating a corrected first timestamp and a corrected second timestamp using the timing offset correction; calculating the time of flight between the machine and the external device using the corrected first timestamp and the corrected second timestamp; and calculating the distance between the machine and the external device using the time of flight.

In example 18, the subject matter of example 17 may optionally include instructions which, when executed by the machine, causes the machine to perform operations further comprising: sending a first action frame to an external device; receiving a first acknowledgement signal from the external device which acknowledges that the external device received the first action frame; receiving a second action frame from the external device, the second action frame including a first timestamp indicating the time at which the external device received the first action frame and a second timestamp indicating the time at which the external device sent the second action frame; and sending a second acknowledgement signal to the external device; wherein calculating a corrected first timestamp comprises combining the first timestamp and the timing offset correction and calculating a corrected second timestamp comprises combining the second timestamp and the timing offset correction;

In example 19, the subject matter of example 17 may optionally include instructions that cause the machine to perform operations further comprising calculating a corrected first timestamp comprises dividing the first timestamp by the timing offset correction; and calculating a corrected second timestamp comprises dividing the second timestamp by the timing offset correction.

In example 20, the subject matter of example 17 may optionally include instructions that cause the machine to perform operations further comprising: receiving a timing offset correction from the second electronic device; and further wherein: the second action frame includes the corrected first timestamp and the corrected second timestamp.

In example 21, the subject matter of example 17 may optionally include the instructions causing the machine to refine the estimate of the a timing offset correction by comparing a long training frame from the second electronic device with a generated long training frame.

Example 22 is a machine-readable medium that stores instructions which, when executed by a machine device, causes the machine to perform operations comprising: negotiating with an external device to determine if the external device is to estimate the timing offset correction; sending a first action frame to an external device; receiving a first acknowledgement signal from the external device which acknowledges that the external device received the first action frame; receiving a second action frame from the external device; and sending a second acknowledgement signal to the external device; wherein the second action frame includes a corrected first timestamp indicating a time at which the external device received the first action frame and a second corrected timestamp indicating a time at which the external device sent the second action frame, when the external device is to estimate the timing offset correction.

In example 23, the subject matter of example 22 may optionally include instructions that further cause the machine device to: calculate the time of flight between the machine device and the external device; and calculate the distance between the machine and the external device using the time of flight.

While certain features of the invention have been illustrated and described herein, many modifications, substitutions, changes, and equivalents may occur to those skilled in the art. It is, therefore, to be understood that the appended claims are intended to cover all such modifications and changes as fall within the scope of the invention.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

We claim:

1. A wireless station (STA) comprising:
computer processing circuitry including a clock; and
transceiver and network interface circuitry;
wherein the transceiver and network interface circuitry:
  sends a first action frame to a first external device;
  receives a first acknowledgement signal from the first external device which acknowledges that the first external device received the first action frame;
  receives a second action frame from the first external device, the second action frame including a first timestamp indicating a time at which the first external device received the first action frame and a second timestamp indicating a time at which the first external device sent the second action frame; and
  sends a second acknowledgement signal to the first external device upon receipt of the second action frame;
and wherein the computer processing circuitry:
  estimates a timing offset correction between the STA and the first external device by using a relative frequency offset comparing a frequency of a clock of the first external device with a frequency of the clock of the computer processing circuitry of the STA, wherein the timing offset correction is estimated without use of satellite positioning signals;
  calculates a corrected first timestamp by dividing the timing offset correction by the first timestamp;
  calculates a corrected second timestamp by dividing the timing offset correction by the second timestamp;
  calculates a fine timing measurement (FTM) between the STA and the first external device using the corrected first timestamp and the corrected second timestamp; and
  calculates the distance between the STA and the first external device using the FTM;
  determines a location of the STA by using trilateration of three separately calculated distances between the STA and three time-synchronized external devices with known locations that are part of the same wireless network; wherein one of the three external devices is the first external device; and
  controls an output of the determined location of the STA.

2. The STA of claim 1, wherein the frequency of the clock of the computer processing circuitry of the STA is determined from a generated short training frame sent from the transceiver and network interface circuitry of the STA; and the frequency of the clock of the first external device is determined from a separate short training frame generated by the first external device.

3. The STA of claim 1, wherein the STA further comprises a display, wherein the determined location of the STA by the computer processing circuitry is output to the display for presentation to a user.

4. The STA of claim 2, wherein the computer processing circuitry is further arranged to refine the estimate of the timing offset correction by comparing a long training frame generated by the first external device with a separate generated long training frame sent from the transceiver and network interface circuitry of the STA.

5. The STA of claim 1, wherein the STA is a portable electronic device.

6. The STA of claim 1, wherein the STA further comprises an input module as a user interface.

7. The STA of claim 1, wherein the STA is an access point.

8. A non-transitory machine-readable medium that stores instructions which, when executed by a machine comprising computer processing circuitry including a clock and transceiver and network interface circuitry, causes the machine to perform operations comprising:
using the transceiver and network interface circuitry to:
  send a first action frame to a first external device;
  receive a first acknowledgement signal from the first external device which acknowledges that the first external device received the first action frame;
  receive a second action frame from the first external device, the second action frame including a first timestamp indicating a time at which the first external device received the first action frame and a second timestamp indicating a time at which the first external device sent the second action frame; and
  send a second acknowledgement signal to the first external device upon receipt of the second action frame;
and using the computer processing circuitry to:
  estimate a timing offset correction between the machine and the first external device by using a relative frequency offset comparing a frequency of a clock of the first external device with a frequency of the clock of the computer processing circuitry of the machine, wherein the timing offset correction is estimated without use of satellite positioning signals;

calculate a corrected first timestamp by dividing the first timestamp by the timing offset correction;

calculate a corrected second timestamp by dividing the second timestamp by the timing offset correction;

calculate a fine timing measurement (FTM) between the machine and the first external device using the corrected first timestamp and the corrected second timestamp;

calculate a distance between the machine and the first external device using the FTM;

determine a location of the machine by using trilateration of three separately calculated distances between the machine and three time-synchronized external devices with known locations that are part of the same wireless network; wherein one of the three external devices is the first external device; and control an output of the determined location of the machine.

9. The non-transitory machine-readable medium of claim 8, further comprising instructions that cause the machine, which further comprises a display, to perform operations further comprising:

outputting the determined location of the machine by the computer processing circuitry to the display for presentation to a user.

10. The non-transitory machine-readable medium of claim 8, wherein the frequency of the clock of the computer processing circuitry of the machine is determined from a generated short training frame sent from the transceiver and network interface circuitry of the machine; and the frequency of the clock of the first external device is determined from a separate short training frame generated by the first external device.

11. The non-transitory machine-readable medium of claim 8, wherein the second action frame further comprises a corrected first timestamp and a corrected second timestamp as determined by the first external device using an estimated timing offset correction determined by the first external device.

12. The non-transitory machine-readable medium of claim 8, further comprising instructions that cause the machine to:

refine the estimate of the timing offset correction by comparing a long training frame generated by the first external device with a separate generated long training frame sent from the transceiver and network interface circuitry of the machine.

13. A non-transitory machine-readable medium that stores instructions which, when executed by a machine comprising computer processing circuitry including a clock and transceiver and network interface circuitry, causes the machine to perform operations comprising:

using the transceiver and network interface circuitry to:

negotiate with a first external device that is an access point to determine that the first external device is to estimate a timing offset correction using a relative frequency offset comparing a frequency of a clock of the first external device with a frequency of the clock of the computer processing circuitry of the machine without use of satellite positioning signals;

send a first action frame including the frequency of the clock of the computer processing circuitry of the machine to the first external device;

receive a first acknowledgement signal from the first external device which acknowledges that the first external device received the first action frame;

receive a second action frame from the first external device that includes a corrected first timestamp indicating a time at which the first external device received the first action frame and a second corrected timestamp indicating a time at which the first external device sent the second action frame; wherein the corrected first timestamp and the second corrected timestamp were determined by the first external device based on the estimated timing offset correction that was estimated by the first external device; and send a second acknowledgement signal to the first external device after receiving the second action frame from the first external device;

and using the computer module to:

calculate a fine timing measurement (FTM) between the machine and the first external device using the first corrected timestamp and the second corrected timestamp;

calculate a distance between the machine and the first external device using the FTM;

determine a location of the machine by using trilateration of three separately calculated distances between the machine and three time-synchronized external devices with known locations that are part of the same wireless network; wherein one of the three external devices is the first external device; and control an output of the determined location of the machine.

14. The non-transitory machine-readable medium of claim 13, further comprising instructions that cause the machine, which further comprises a display, to perform operations further comprising: outputting the determined location of the machine by the computer processing circuitry to the display for presentation to a user.

* * * * *